Patented Apr. 28, 1925.

1,535,361

UNITED STATES PATENT OFFICE.

WILLIAM L. von EDELKRANTZ, OF SAN FRANCISCO, CALIFORNIA.

COMPOSITION OF MATTER FOR TIRE FILLERS.

No Drawing. Application filed August 13, 1923. Serial No. 657,188.

*To all whom it may concern:*

Be it known that I, WILLIAM L. VON EDELKRANTZ, a subject of the King of Denmark, residing in the city and county of San Francisco and State of California, have invented a new and useful Improvement in a Composition of Matter for Tire Fillers, of which the following is a specification.

My invention relates to a new composition of matter to be used as a substitute for compressed air in motor vehicle tires, wherein a light, porous and elastic composition is injected under pressure into a tire while in a plastic state.

The primary object of my invention is to provide a new and improved composition of matter to be used as a substitute for compressed air within a motor vehicle tire.

Another object is to provide a new and improved composition of matter suitable for use as a tire filler.

A further object of the invention is to provide a new and improved composition of matter which may be used as a tire filler and having elastic properties sufficient to support a motor vehicle and at the same time capable of being easily and readily introduced into the inner tube of a tire.

A still further object of the invention is to provide a new and improved tire filler having shock-absorbing properties and while porous, to have non-absorbent qualities.

Another object is to provide a tire filler of the type set forth which will remain unchanged and unaffected by the action of extreme heat or cold.

I accomplish these and other objects by means of the composition of matter described in the following specification.

In the manufacture of my improved composition of matter I first obtain three parts of a gelatinous matter, such as glue softened and mixed with water to which is added two parts of water. This composition is dissolved in four parts of glycerine, adding one-tenth of one part of dextrin and one-tenth of one part of oxide of zinc and the whole beaten until it has increased one-hundred per cent in volume, after which I add three parts of a saccharine material, such as glucose, molasses or syrup, and the whole mixture again throughly stirred and beaten at a temperature of from 70 to 90 degrees centigrade, until the mass assumes three times its original volume.

The beating process at this temperature thoroughly aerates the compound producing a very light, spongy and resilient mass. The temperature of the compound is then reduced to about 32 degrees centigrade and one one-hundred and sixtieth part of forty per cent formaldehyde is added to harden the mass to prevent melting and absorption of moisture, the mass meanwhile being thoroughly and briskly stirred for from sixty to ninety seconds.

The resulting compound is now a light spongy resilient mass in a plastic state and readily forced under pressure into the inner tube of a motor tire, and through the stem thereof, the valve having been removed and a vent provided at a point opposite the point of ingress of the compound.

The composition thus forced into the tube under pressure is a very light, porous and resilient mass, adapted to readily and effectively cushion the load and to absorb shocks.

The hardening of the mass with formaldehyde prevents the composition from melting under high temperatures so that the consistency remains constant.

The porosity produced by the aerating process provides a light weight resilient composition which will effectively maintain the tire in the proper degree of inflation. Its plasticity will effectively fill the inner tube with a uniform pressure throughout and thereby maintain a constant resiliency throughout all portions of the tire. Being incased within the rubber inner tube no condensation can take place and consequently the composition will not harden.

When used as a substitute for compressed air within a motor vehicle tire it will eliminate deflection by puncture and being plastic will distribute the pressure uniformly throughout the tire and readily absorb all shocks.

Having thus described my invention what I claim as new and desire to secure by Letters Patent is—

1. The herein-described composition of matter consisting of three parts gelatine, two parts of water, four parts of glycerine, one tenth of one part of dextrin, one tenth of one part of oxide of zinc, three parts glucose, and one one-hundred and sixtieth part of forty per cent formaldehyde, substantially as set forth.

2. The herein-described composition of matter consisting of gelatine, water, glycerine, dextrin, oxide of zinc, glucose and formaldehyde, proportioned substantially as described to form a light, porous, and resilient tire filler.

In witness whereof I hereunto set my signature.

WILLIAM L. von EDELKRANTZ.